Figure 5:
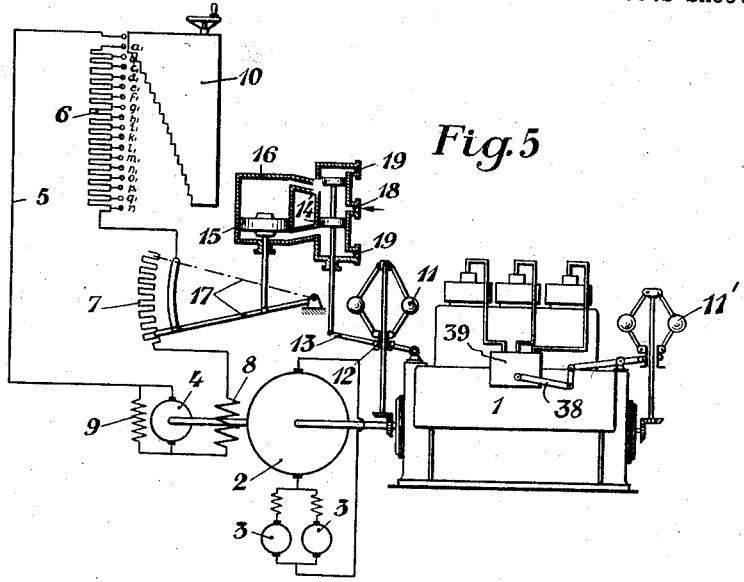

Nov. 17, 1936.                O. SIMMEN                    2,060,900
           CONTROL APPARATUS FOR VEHICLES OF THE DIESEL-ELECTRIC TYPE
                   Filed Nov. 30, 1932         3 Sheets-Sheet 1
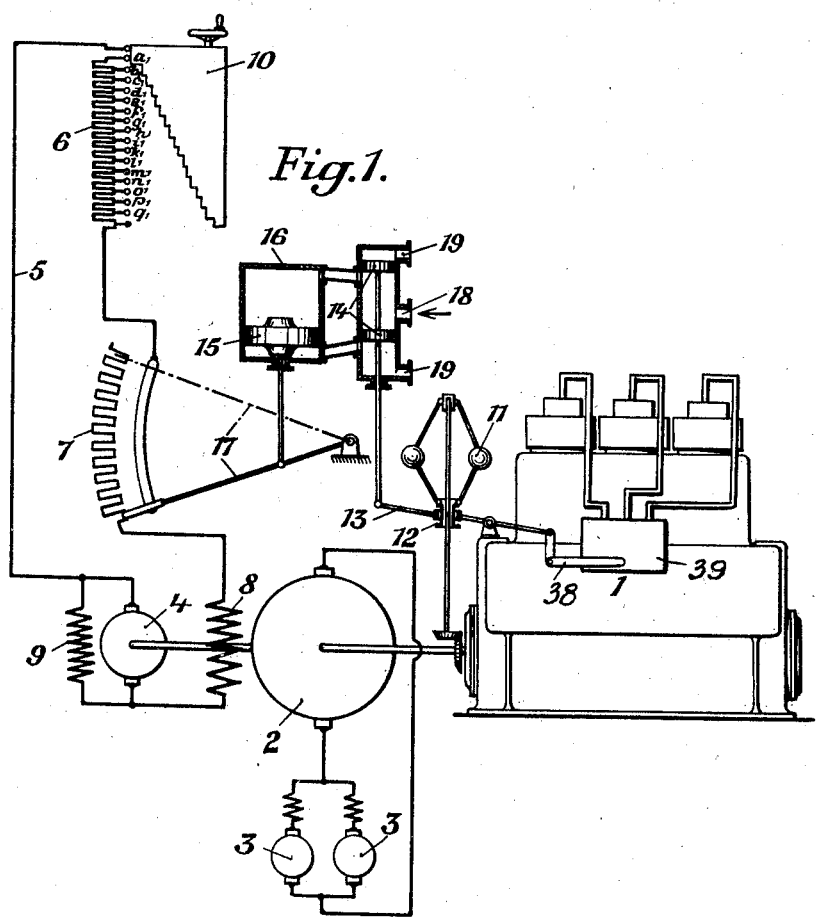
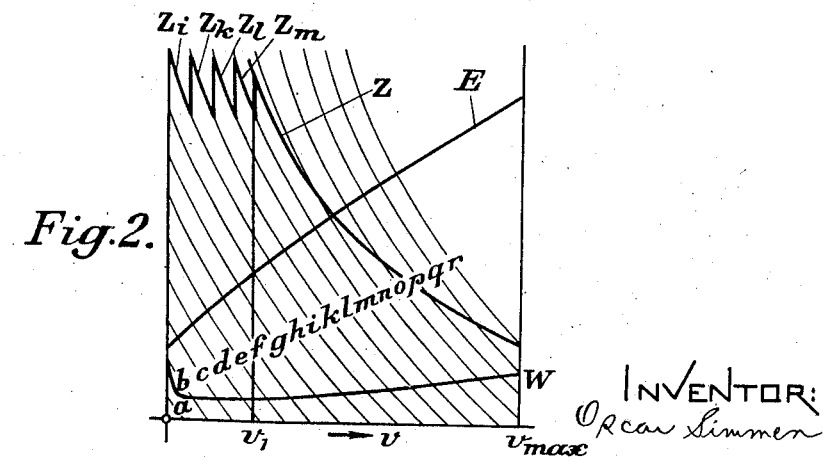

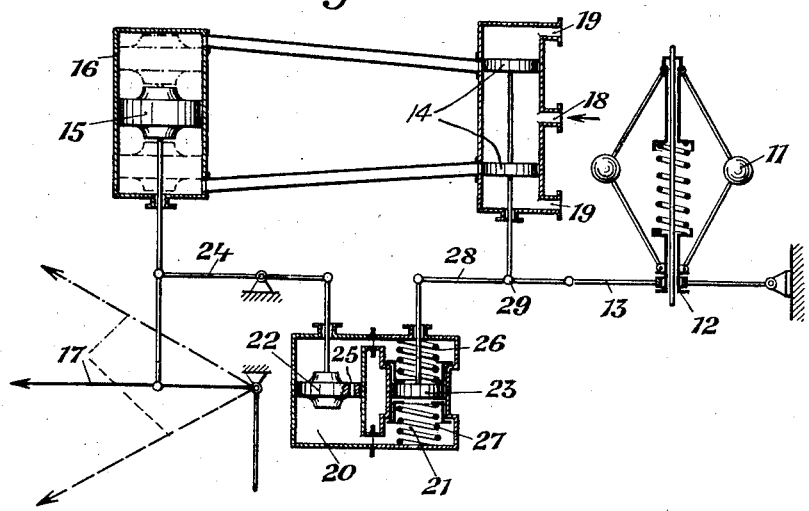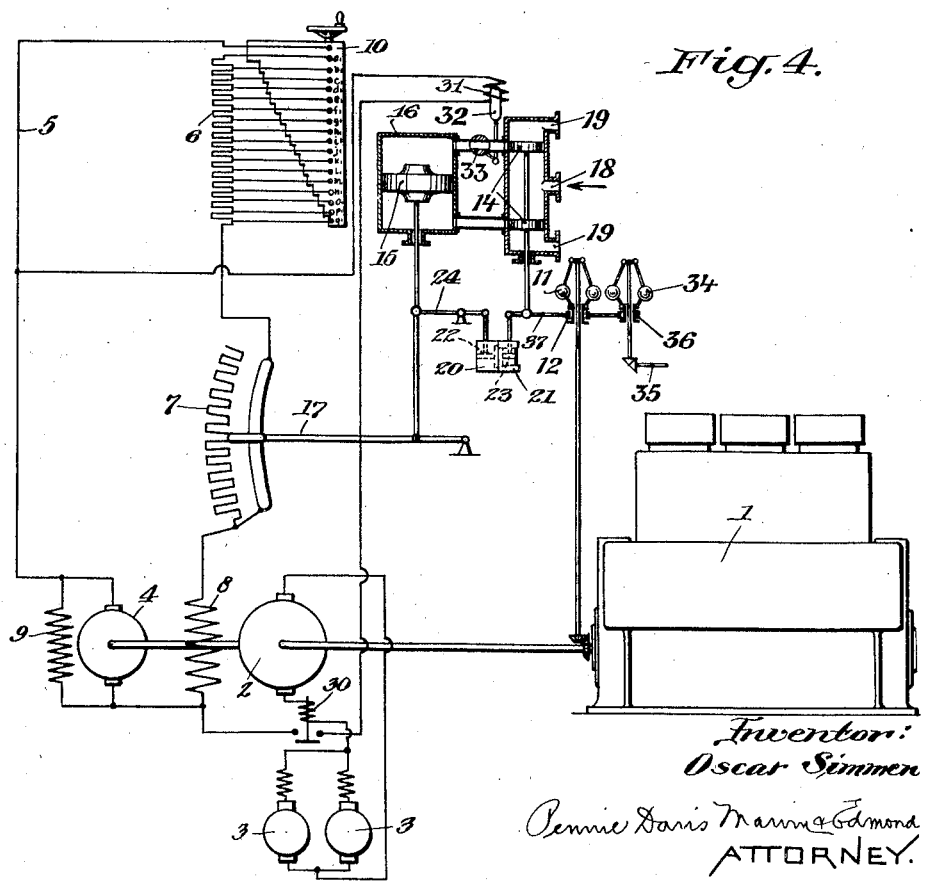

Nov. 17, 1936.                O. SIMMEN                    2,060,900
          CONTROL APPARATUS FOR VEHICLES OF THE DIESEL-ELECTRIC TYPE
                     Filed Nov. 30, 1932          3 Sheets-Sheet 3

INVENTOR
Oscar Simmen
BY Pennie, Davis,
Marvin & Edwards
HIS ATTORNEYS

Patented Nov. 17, 1936

2,060,900

UNITED STATES PATENT OFFICE 2,060,900

CONTROL APPARATUS FOR VEHICLES OF THE DIESEL-ELECTRIC TYPE

Oscar Simmen, Erlach, Switzerland, assignor to firm Sulzer Freres Societe Anonyme, Winterthur, Switzerland Application November 30, 1932, Serial No. 644,984
In Switzerland December 4, 1931

6 Claims. (Cl. 290—17)

This invention relates to control apparatus for vehicles of the Diesel-electric type having a Diesel-electric generating plant which supplies current to the traction motor or motors of the vehicle. The object of the invention is to provide control apparatus for automatically regulating the speed of the vehicle so as to maintain a substantially uniform torque on the Diesel engine, at least in the region of full torque.

According to this invention a variable resistance for the excitation circuit of the generator which supplies current to the traction motors, is controlled automatically by the speed governor of the engine so that this resistance is inserted in the circuit whenever, on reaching the full torque speed, the starting resistance controlled from the driver's cab is switched out of the excitation circuit. The automatically controlled resistance is then progressively cut out of the circuit under the control of the governor as the speed of the vehicle increases.

The starting resistance, or a part thereof, may either constitute the resistance controlled by the engine governor or be independent of that resistance. Preferably an isodromic return device is associated with the governor control mechanism so that the variable resistance remains set in any appropriate position when the governor is in its normal working position, for example, the full torque position.

The following is a description by way of example of one arrangement of control apparatus according to this invention with reference to the accompanying drawings in which:

Figure 1 shows, somewhat diagrammatically, the arrangement of the generating plant and driving motors and the control apparatus therefor, Figure 2 shows curves indicating the relation between the speed of the vehicle and the tractive effort, the voltage and the resistance to motion, and Figures 3 to 7 inclusive show, also diagrammatically, modifications of the control apparatus shown in Figure 1.

As shown in Figure 1 a Diesel engine 1 drives a main electric generator 2 which supplies current to the vehicle traction motors 3. The field coil 8 of the main generator 2 is connected to an auxiliary excitation generator 4, also driven by the engine 1, by a circuit which includes the conductor 5, a starting resistance 6 and a variable resistance 7. The field coil 9 of the excitation generator 4 is connected directly across this generator. The value of the excitation current of the main generator can thus be controlled by movement of the operating lever 17 of the variable resistance 7 or by a controller 10 which is arranged to cut out the starting resistance 6 in steps which are lettered $a^1$—$r^1$ and correspond respectively to the curves $a$—$r$ shown in Figure 2.

The position of the control lever 17 is controlled by the speed governor 11 of the Diesel engine 1 by means of operating mechanism comprising a power piston 15 acting in a cylinder 16 and connected to the lever 17, and a piston valve 14 having ports 18 and 19 respectively connected to a source of pressure fluid and to exhaust. The valve 14 controls the supply of operating fluid for the power piston 15 and is connected to a pivoted lever 13 which is operated by the sleeve 12 of the engine governor 11.

In Figure 2 the curves $a, b, c \ldots r$ show the relationships between the tractive effort (ordinate) and the speed $v$ (abscissae) of the vehicle which correspond to successively increasing values of the excitation current of the main generator. The curve E is the speed-voltage curve of the generator and the curve W the speed-resistance to motion curve of the vehicle.

On starting the vehicle the resistance in the excitation circuit of the generator is cut out in steps which are such that the tractive effort does not exceed the value at which wheel slip will occur and the tractive effort thus varies in the manner indicated by the curves $Z_i$, $Z_k$, $Z_l$, $Z_m$. When a vehicle speed, indicated at $v_1$, is reached at which the full power of the Diesel engine is utilized, this speed being referred to as the "full torque speed", the remaining sections of the starting resistance are rapidly cut out, and the control apparatus according to this invention is so arranged that the engine governor operates, immediately following the cutting out of the remainder of the starting resistance, to introduce into the excitation circuit a variable resistance, which is of sufficient value to prevent the engine being subjected to excessive torque.

The governor then acts to cut out this variable resistance progressively as the speed of the vehicle increases, in such a manner that the engine continues to operate at approximately full torque, the relationship between the speed and the tractive effort being indicated by the curve Z in Figure 2. The tractive effort is thus automatically controlled in such a manner that the torque on the engine, which is a function of the product of the tractive effort Z and the speed $v$, remains substantially constant. It is to be noted that at any point on the curves of Figure 2 the difference between the vehicle resistance curve W and the tractive effort curve Z shows the tractive effort which is available for accelerating the vehicle.

When the vehicle is started the Diesel engine is not subjected to full torque; hence the governor sleeve will be in its uppermost position and the power piston 15 will be in its lowermost position, as shown in Figure 1, the resistance 7 being completely cut out of the excitation circuit. During starting the steps $a^1$—$m^1$ of the resistance 6, which correspond respectively to the excitation curves $a$ to $m$ in Figure 2, are successively cut out by the controller 10 and the vehicle attains its "full torque speed" $v_1$. The steps $n^1$—$r^1$ are then rapidly cut out so that momentarily there is no resistance in the excitation circuit and the Diesel engine is subjected to excessive torque. The consequent downward movement of the sleeve 12 of the governor 11 below the full torque position causes the piston valve 14 to move downwardly thus admitting the pressure fluid from the port 18 to the underside of the power piston 15 and connecting the upper side of this piston to the upper exhaust port 19. The piston 15 then moves to its uppermost position thus moving the lever 17 to the position shown in chain lines in which the whole of the variable resistance 7 is in series in the excitation circuit.

The introduction of this resistance into the excitation circuit reduces the output of the main generator so that the governor sleeve 12 rises to, or above, the full torque position. This raises the control valve 14 so that the pressure fluid is cut off from the underside of the power piston 15 and, if the governor rises above the full torque position, pressure fluid is supplied to the upper side of this piston which then moves lever 17 to reduce the effective value of resistance 7. As the speed of the vehicle increases the torque on the engine decreases and the governor operates in a manner that will be clear from the above description to decrease the value of the variable resistance 7. The tractive effort and speed of the vehicle thus correspond to the curve Z in Figure 2 whilst the Diesel engine operates continuously at substantially full torque. The speed governor 11 may also control the supply of fuel to the Diesel engine, or a separate governor may be employed for this purpose. Thus, according to Fig. 1, the speed governor 11 actuates the fuel control lever 38 of the fuel pump 39, whereas, in the modification shown in Fig. 5, a separate speed-responsive device, or governor, 11' is provided for actuating fuel control lever 38, in order to regulate the speed of the engine. It will be understood that the governor 11' operates to maintain the speed of the engine constant within a predetermined range in the customary way.

In order to reduce hunting the control apparatus may be modified in the manner shown in Figure 3 by the provision of an "isodromic" return or resetting device. When such a device is employed the power piston 15 is connected to the piston valve 14 by the "isodromic" device 20—27 which allows the piston 15 and consequently the lever 17 of the variable resistance 7 to remain set in any position so that the governor may occupy the same normal operating position, e. g., the full torque position, independently of the position of the piston 15.

The device 20—27 comprises two cylinders 20 and 21 connected at opposite ends by passages and filled with any suitable liquid. A piston 22 in the cylinder 20 is connected by a pivoted lever 24 to the power piston 15, and a piston 23 in the cylinder 21 is connected to the end of a floating lever 28 pivoted at its other end to the governor lever 13 and at a point 29 between its ends to the piston valve 14. Springs 26 and 27 normally maintain the piston 23 in its central position and a leakage hole 25 is provided in the piston 22 through which the liquid gradually flows as the piston 23 is returned by one of the springs 26 and 27 to its normal central position following a movement thereof brought about by movement of the piston 22. The device thus returns the end of the lever 28 to the normal position as shown in Figure 3 independently of the position of the power piston 15 and the piston 22.

The upward movement of the power piston 15 following cutting out of the steps $n^1$—$r^1$ of the starting resistance, as described above, causes downward movement of the piston 22 of the isodromic device and thus forces the piston 23 upwards against the spring 26. The floating lever 28 is moved by the piston 23 to close the valve 14. As the resistance 7 is inserted in the excitation circuit the output of the generator is decreased and the governor 11 returns to its full torque position. At the same time the isodromic device has its piston restored to its normal central position by the spring 26 so that the piston valve 14 is kept in its closed position and the position of the power piston 15 remains unaltered.

If desired, the starting resistance can be controlled automatically, so that the tractive effort is maintained below the value at which wheel slip occurs. In such an arrangement, as shown in Figure 4, an overload relay 30, in series in the circuit of the traction motors 3, controls an operating solenoid 31, 32 for a valve 33. This valve is arranged between the piston valve 14 and the power piston 15 so that when the valve 33 is operated, following operation of the relay 30, it prevents pressure fluid being supplied to the upper side of the power piston 15 to move this piston downwardly to cause a decrease in the value of the resistance 7 and thus an increase in the excitation current and in the output of the generator. The relay 30 is set so that it operates when the current supplied to the traction motors exceeds a predetermined value above which wheel slip is likely to occur.

When required an additional governor 34 may be provided which is rotated by a shaft 35 driven from one of the axles of the vehicle. This governor serves to prevent the maximum speed of the vehicle, $v_{max}$ in Figure 2, being exceeded and its sleeve 36 conveniently replaces the fixed pivot of the lever 37 (13 in Figures 1 and 3) controlled by the engine governor 11. When the speed of the vehicle exceeds a predetermined value the governor sleeve 36 rises and the lever 37, pivoting about the governor sleeve 12, lowers the piston valve 14 so that pressure fluid is admitted to the underside of the power piston 15. The piston 15 then rises to increase the effective value of the resistance 7 and thus to decrease the excitation current and the output of the generator.

Figure 6:
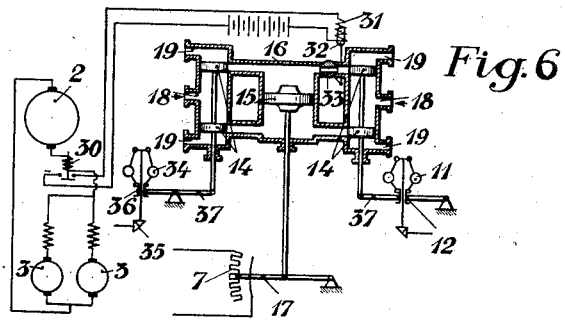
Figure 7:
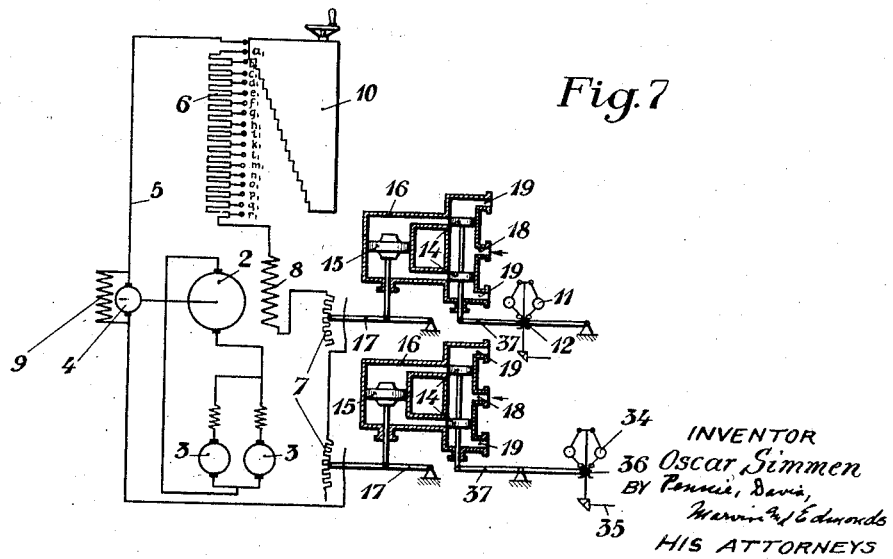

If desired the governor 34 may control, as shown in Fig. 6, a separate piston valve for the power piston instead of acting on the lever of the engine governor or may even, as shown in Fig. 7, control a separate resistance 40 in the excitation circuit of the main generator. If it is desired to limit the speed of the vehicle to a value below $v_{max}$ the controller 10 may be set so that some of the resistance sections remain in circuit. For example, if this controller is set at the step $m^1$ the maximum speed which can be attained by the vehicle corresponds to the value of $v$ at the point of intersection of the curves $m$ and $W$ in Figure 2. The controller 10 in conjunction with its associated resistance 6 thus serves not only as the starting controller for the vehicle but also as a convenient means for limiting the maximum speed the vehicle reaches under the control of the automatic gear.

It will be apparent that the control gear can be adjusted to vary the value of the "full torque" at which it is desired to work the Diesel engine by adjusting the tension of the spring of the engine governor or by varying the cut-off positions of the piston valve or in any other suitable manner.

It will be appreciated that the above description is by way of example only and that modifications may be made within the scope of the invention.

I claim:

1. A vehicle comprising an engine, a speed-responsive device operated by the engine for maintaining the engine speed constant within a predetermined range, a generator driven by said engine having a motor connected thereto for propelling the vehicle, an excitation system for said generator including manually operated vehicle control means for varying the excitation of said generator to gradually apply torque to said engine and start the vehicle, and means actuated in accordance with variation in the speed of said engine for so varying the excitation of said generator as to maintain the torque applied to said engine by the manipulation of said manually operated control means substantially constant under varying operating conditions of the vehicle.

2. A vehicle comprising an engine, a generator driven by said engine having a motor connected thereto for propelling the vehicle, an excitation system for said generator including manually operated control means for varying the excitation of said generator to apply torque gradually to said engine, a speed-responsive device operated by said engine, and means actuated thereby for so varying the excitation of said generator as to maintain the torque on said engine applied thereto by the manipulation of said manually operated control means substantially constant under varying operating conditions of the vehicle.

3. A vehicle comprising an engine, a speed-responsive device operated by the engine for maintaining the engine speed constant within a predetermined range, a generator driven by said engine having a motor connected thereto for propelling the vehicle, an excitation system for said generator including variable resistance for varying the excitation of said generator, manually operated vehicle control means for varying a portion of said resistance to gradually apply torque to said engine and start the vehicle, and means actuated in accordance with variation in the speed of said engine for so varying another portion of said resistance as to maintain the torque applied to said engine by the manipulation of said manually operated control means substantially constant under varying operating conditions of the vehicle.

4. A vehicle comprising an engine, a speed-responsive device operated by the engine for maintaining the engine speed constant within a predetermined range, a generator driven by said engine having a motor connected thereto for propelling the vehicle, an excitation system for said generator including manually operated vehicle control means for varying the excitation of said generator to gradually apply torque to said engine and start the vehicle and including also resistance for varying the excitation of said generator, means actuated in accordance with variation in the speed of said engine for regulating said resistance, and means associated therewith responsive to the current through said motor to prevent decreasing said resistance when said current exceeds a predetermined value to thereby prevent the tractive effort developed by said motor from exceeding a value which would cause slippage of the driving wheels of the vehicle.

5. A vehicle comprising an engine, a speed-responsive device operated by the engine for maintaining the engine speed constant within a predetermined range, a generator driven by said engine having a motor connected thereto for propelling the vehicle, an excitation system for said generator including manually operated vehicle control means for varying the excitation of said generator to gradually apply torque to said engine and start the vehicle, means actuated in accordance with variation in the speed of said engine for varying the excitation of said generator to maintain substantially constant the load applied thereto by the manipulation of said manually operated control means, and means responsive to the speed of the vehicle associated with said excitation system for reducing the power output of the generator when the speed of the vehicle exceeds a predetermined amount.

6. A vehicle comprising an engine, a speed-responsive device operated by the engine for maintaining the engine speed constant within a predetermined range, a generator driven by said engine having a motor connected thereto for propelling the vehicle, an excitation system for said generator including manually operated vehicle control means for varying the excitation of said generator to gradually apply torque to said engine and start the vehicle, a resistance capable of being put in said excitation system, and means actuated upon a decrease in the speed of said engine for putting at least a part of said resistance in the excitation system to cause the torque applied to the engine by the manipulation of said manually-operated means to be maintained substantially constant under varying operating conditions of the vehicle.

OSCAR SIMMEN.